United States Patent Office ──

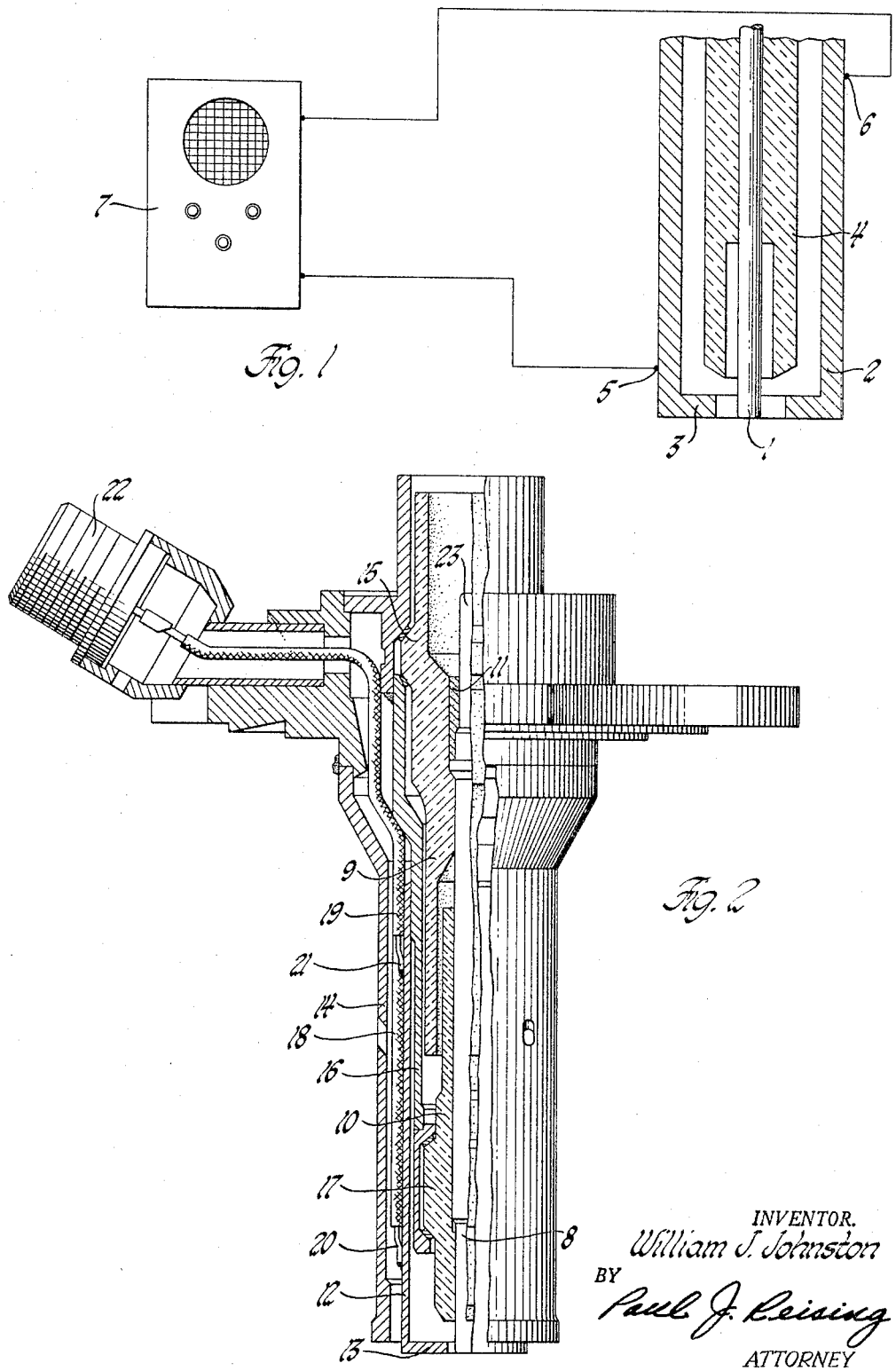

3,274,487
Patented Sept. 20, 1966

3,274,487
IGNITER PLUG WITH SPARK-SENSING MEANS
William J. Johnston, Flint, Mich., assignor to General Motors Corporation, Detroit, Mich., a corporation of Delaware
Filed Aug. 15, 1961, Ser. No. 131,678
4 Claims. (Cl. 324—17)

This invention relates to an igniter plug useful for rocket and jet engines and having means to detect and indicate the occurrence of arcing across the igniter spark gap.

It is desirable that igniters, and particularly igniters for rocket propelled missiles, be equipped with means whereby it can be known whether the igniter is operative prior to admission of the fuel to the rocket engine's combustion chamber and also during flight of the missile. The spark-sensing means which have heretofore been proposed comprised a probe extending into spaced relationship with one of the igniter electrodes at the spark gap such that a voltage could be applied across the gap between the probe and one of the electrodes, such voltage being insufficient to cause conduction between the probe and one electrode in the absence of arcing between the two igniter electrodes but sufficient to cause conduction between the probe and the one electrode upon the occurrence of arcing in the gap between the igniter electrodes. An igniter with this type of spark-sensing means is covered by United States patent application Serial No. 56,241, filed September 15, 1960, now Patent Number 3,235,763 in the names of Alfred Candelise, Harold W. Reese and John A. Whaley, and assigned to the assignee of the present invention. While such spark-sensing means is effective, it has the disadvantage of complexity and relatively high cost both in the construction of the igniter itself and in the circuitry and instrumentation system which it requires. For example, because such system is one of high impedance it requires an amplifier in the circuit quite close to the probe in order to transmit an effective signal even a few hundred yards to the instrumentation installation where monitoring of rocket engine performance takes place.

It is an object of the present invention to provide an igniter plug with an improved spark-sensing means which has the advantage of simplicity and the attendant advantages of increased reliability and relatively low cost. A further and related object of the invention is the provision of an igniter spark-sensing means which allows for considerable simplification of the circuitry and instrumentation required to provide a strong spark-indicating signal at the monitoring station. Briefly, these objects are accomplished in accordance with the invention by the provision of a rocket igniter wherein a portion of one of the electrodes of the igniter is utilized as an electrical resistance element, there being two electrical connections to the electrode at spaced points along the direction of flow of current therethrough such that the voltage drop across the two spaced points can be measured. Since there is current flow through the electrode only when arcing occurs across the spark gap, the occurrence of a drop in potential across the two spaced points provides indication that sparking is occurring.

These and other objects, advantages and features of the invention will appear more clearly from the following detailed description thereof made with reference to the drawings in which:

FIGURE 1 is a sectional view of a simplified embodiment of the invention with the circuitry and instrumentation shown schematically; and FIGURE 2 shows a preferred embodiment with parts broken away and in partial section.

Referring now to FIGURE 1, the igniter plug shown comprises a metal center electrode 1 extending axially through a metal shell 2 which serves as the ground electrode, the lower end of the center electrode being in spaced relation with an in-turned flange 3 at the bottom of the shell to form a spark gap therewith. A conventional ceramic insulator 4 surrounding the center electrode serves to electrically separate the center electrode from the shell or ground electrode. In accordance with the present invention there is an electrical connection to the shell at the lower end thereof adjacent the spark gap, as shown at 5, and a second electrical connection up higher on the shell, at a point spaced axially from the first connection, as shown at 6. The wires leading from the two electrical connections extend to suitable instrumentation 7 for indicating any voltage drop across points 5 and 6. The device operates as follows: If the igniter is inoperative such that no arcing occurs across the spark gap, there is no current flow through the shell and hence no indication by the instrumentation of a drop in potential between points 5 and 6. But if the igniter is operative to provide arcing across the spark gap, then there is a current flow through the shell and the inherent electrical resistance of the shell material provides a voltage drop across points 5 and 6, which drop will be read by the instrumentation to thereby indicate the operativeness of the igniter. By the use of conventional materials such as steel or Inconel for the shell 2 and by suitable spacing of the connections 5 and 6, the shell section between points 5 and 6 can provide a resistance on the order of about 1 to 10 milliohms and, with a current on the order of 100 amps, this provides about a $\frac{1}{10}$ volt drop across the connections which is easily detectable with an oscilloscope or other suitable instrumentation. Because the system is one of very low impedance it can transmit its signal a considerable distance without need for amplification equipment adjacent the igniter. This feature considerably simplifies the electrical circuitry and equipment required which is highly advantageous, particularly in that it greatly increases reliability by the elimination of electrical components subject to failure.

FIGURE 2 shows a much refined embodiment of the invention which includes a center electrode 8 surrounded by two telescoping ceramic insulators 9 and 10 and secured in the upper insulator 9 by a body of fused glass 11. The ground electrode is in the form of a metal sleeve 12 having an inwardly extending flange 13 at the lower end thereof extending into spaced relation with the lower end of the center electrode to form a spark gap therewith. The metal shell assembly includes, in addition to the ground electrode 12, an outer cylindrical metal sleeve 14 which serves as a passageway for the admission of gas, its only function specifically as regards the present invention being that it serves as shielding to prevent inducted currents in the electrical leads 18 and 19 hereafter described. The upper insulator 9 is secured within the shell by means of a conventional external annular shoulder 15 and the lower insulator 10 is secured by means of a metal sleeve 16 which extends concentrically within the ground electrode sleeve 12 and the lower end of which is shaped to engage a shoulder 17 on the lower insulator.

In accordance with the invention, a pair of electrical leads 18 and 19, each with a covering of heat-resistant insulating material, extend downwardly through the shell between sleeve 14 and ground electrode sleeve 12, wire 18 being bonded in electrical contact with ground electrode sleeve 12 toward the lower end thereof, at point 20, and wire 19 being bonded in electrical contact with sleeve 12 toward the upper end thereof at point 21. A suitable electrical connector for making contact between the wires 18 and 19 and the instrumentation (not shown) is located at the top of the shell as shown at 22.

The electrical connections for the igniter are provided by the top of the center electrode as shown at 23 and by the shell itself.

Operation of the igniter and the spark-sensing means is as described above in connection with FIGURE 1. That is, upon the occurrence of arcing in the spark gap, current flows through the ground electrode sleeve 12 thereby providing a drop in potential across points 20 and 21, which drop in potential is detected by the instrumentation to thereby indicate operativeness of the igniter. If the igniter is inoperative there is no current flow through the ground electrode and hence no indication by the instrumentation of a drop in potential across points 20 and 21.

To assure against any induced currents in the cable connections to the leads 18 and 19 and thereby prevent false readings, it is desirable that suitable shielding be used. As indicated above in the description of shell sleeve 14, the shell structure of the embodiment shown in FIGURE 2 serves as shielding for the leads 18 and 19 within the igniter.

It will be noted that inner sleeve 16, which serves to secure the lower insulator, is spaced from the ground electrode sleeve 12 between contact points 20 and 21. This feature is covered by United States patent application Serial Number 131,683, now Patent Number 3,238,447, filed concurrently herewith in the name of Wilfred A. Bychinsky, and serves to insure against malfunction of the system by reason of a cracked insulator. That is, if, because of a cracked insulator, arcing occurs within the interior of the igniter rather than at the spark gap, the current flow for the arcing circuit will occur not through the ground electrode sleeve 12 but through the inner sleeve 16, and since the sleeve 16 forms no part of the spark monitoring circuit such current flow will be ineffective to indicate proper functioning of the actually malfunctioning igniter.

For optimum heat resistance it is desirable that each of the electrical leads 18 and 19 comprise a wire having as its insulation packed magnesium oxide swaged within a metal tube which concentrically surrounds the wire. With such a lead, the metal tube serves as adequate electrical shielding to prevent induced currents thereby dispensing with the need for outer sleeve 14 as regards its aforementioned shielding function.

It will be understood that while the invention has been described with reference to particular embodiments thereof, various changes and modifications may be made, all within the full and intended scope of the claims which follow.

I claim:

1. An igniter plug having a pair of electrodes with end portions in spaced relationship to provide a spark gap therebetween, one of said electrodes having a second portion thereof electrically grounded, means for indicating whether arcing is occurring in said gap, said means including a pair of electrical conductors connected to the grounded electrode at spaced points thereon located along the axis of said grounded electrode between said end portion and said second portion to indicate any voltage drop across said spaced points.

2. An igniter plug as set forth in claim 1 and including shielding means for said conductors to prevent induced currents therein.

3. An igniter plug having a center electrode surrounded by a metal shell which serves as a part of the ground electrode, the end portions of said electrodes being in spaced relationship to provide a spark gap therebetween, a second portion of said shell being electrically grounded and spaced from the end portion of the shell, and means for indicating whether arcing is occurring in said gap, said means including a pair of electrical conductors connected to said shell at spaced points thereon along the axis thereof between said end portion and said second portion to indicate any voltage drop across said spaced points.

4. An igniter plug comprising an elongated center electrode extending concentrically through a tubular shaped electrode and separated therefrom by an electrical insulator, said electrodes having end portions in spaced relationship to provide a spark gap therebetween, said tubular shaped electrode having a second portion which is electrically grounded and spaced from said end portion, a pair of electrical conductors connected to the grounded electrode at points spaced along the axis of the grounded electrode between said end portion and said second portion, and means connected to said conductors to indicate any voltage drop across said spaced points.

References Cited by the Examiner

UNITED STATES PATENTS

| | | | |
|---|---|---|---|
| 1,395,570 | 11/1921 | Holland | 324—17 |
| 1,536,808 | 5/1925 | Norden | 324—17 |

WALTER L. CARLSON, *Primary Examiner.*

G. S. KINDNESS, C. F. DUFFIELD, G. R. STRECKER, *Assistant Examiners.*